Sept. 23, 1952 W. S. PERCIVAL 2,611,860
SINGLE SIDE BAND RADIO SIGNALING
Filed Aug. 27, 1949
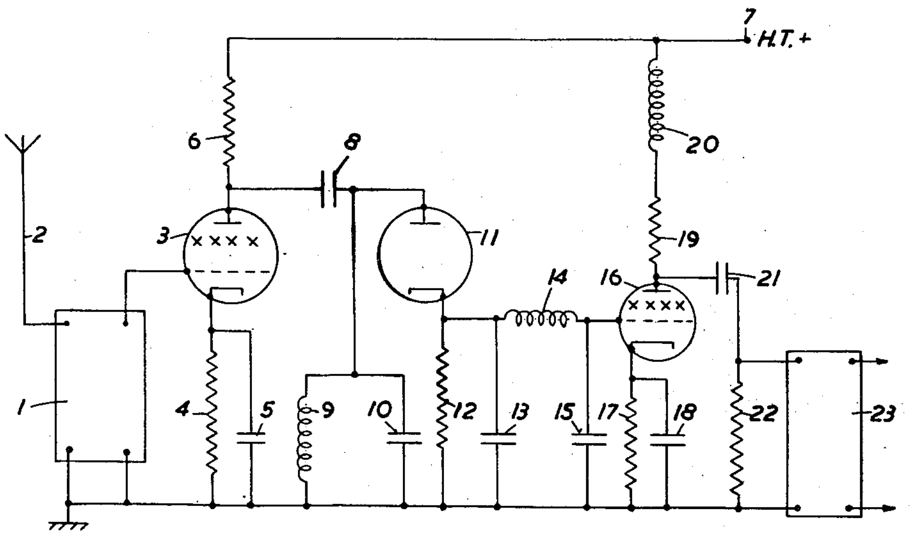
*Inventor*
WILLIAM SPENCER PERCIVAL
By Ralph E. Atherton
*Attorney*

Patented Sept. 23, 1952 2,611,860

UNITED STATES PATENT OFFICE 2,611,860

SINGLE SIDE BAND RADIO SIGNALING

William Spencer Percival, Ealing, London, England, assignor to Electric & Musical Industries Limited, Hayes, England, a British company Application August 27, 1949, Serial No. 112,657
In Great Britain September 4, 1948

1 Claim. (Cl. 250—20)

This invention relates to asymmetric side band radio signalling. It relates particularly but not exclusively to asymmetric side band television.

It is well known that, in asymmetric side band radio signalling, serious distortion of transients results. (See "Proceedings of the Institute of Radio Engineers," December 1940, page 557 et seq.)

The object of the invention is to provide means for reducing this distortion, and according to the invention means are provided whereby the frequencies which correspond to higher modulation frequencies are attenuated prior to detection relative to those frequencies corresponding to lower modulation frequencies, and means are also provided for boosting the higher frequencies relative to lower frequencies after detection whereby to compensate at least partly for said attenuation.

The distortion introduced can be shown to be greater, the greater is the rate of change of the instantaneous amplitude of the carrier wave, so that for example a change in the carrier wave amplitude from one level to another is subjected to more distortion the more rapidly the change occurs. Thus, the more the spectrum of the signal is restricted to low frequencies the less will be the distortion in the detected signal. Therefore by progressively attenuating the signal in accordance with the frequency a reduction of distortion can be obtained.

The high frequency attenuation should not be such as to reduce the high frequency components to a level comparable with noise.

The attenuation may be obtained in a superheterodyne receiver by suitable modification of the pass band of one or more of the intermediate frequency circuits, or by tuning one or more of said circuits to a frequency within the vestigial side band instead of to the centre of the carrier frequency. The progressive boosting of the high frequencies subsequent to detection may be effected for example by means of a series inductance preceding the grid-cathode capacity (augmented if necessary by a condenser) of an amplifying valve, which in the case of a television receiver may be a video frequency amplifying valve.

In order that the said invention may be clearly understood and readily carried into effect, the same will now be more fully described with reference to the accompanying drawing, the single figure of which is a circuit diagram of part of a television superheterodyne receiver incorporating the invention.

Referring to the drawing, reference numeral 1 represents the H. F. amplifier, the frequency changer, and the I. F. amplifier. All of these parts may be of conventional or known design and do not require to be described in detail. Television signals received by an antenna 2 are fed to the H. F. amplifier, and the signals of intermediate frequency are fed to the control electrodes of an amplifying electron discharge tube 3. The cathode of tube 3 is connected to ground via a bias resistor 4 which is shunted by a bypass capacitor 5, and the anode of tube 3 is connected via a load resistor 6 to the positive H. T. terminal 7. The output of tube 3 is fed, via blocking capacitor 8 and a single tuned circuit formed by inductance 9 and capacitor 10 in parallel, to a detector constituted by a diode 11, the load resistor 12 of which is shunted by a capacitor 13. The output of the detector is fed via a coupling circuit comprising series inductance 14 and shunt capacitor 15, to the control electrode of a video frequency amplifying tube 16. The cathode of tube 16 is connected to ground via a bias resistor 17 shunted by a by-pass capacitor 18, and the anode is connected, via load resistor 19 and inductance 20, to positive H. T. terminal 7. The output of tube 16 is fed, via blocking capacitor 21 and shunt resistor 22, to a further video frequency amplifying stage 23 which may be of conventional design and the output of which is fed to the picture reconstituting cathode ray tube (not shown).

The progressive attenuation of the side band frequencies of received signals with increasing frequency, prior to detection is effected mainly by the tuned circuit 9, 10. Resistor 6 damps said tuned circuit and assists in shaping the response curve thereof. The I. F. amplifier which feeds tube 3 is selected to have as flat a response as possible but in fact its response will fall off in amplitude for the higher side bands. It may be assumed for example that its response falls to a relative value of 0.78 at side band frequencies $\pm f$. Then the values of resistor 6 and capacitor 10 may be chosen so that the overall response falls to a relative value of 0.37 at side band frequencies of $\pm f$. The required value of inductance 9 is then determined by the condition that the circuit 9, 10 is tuned to the intermediate frequency. If preferred, circuit 9, 10 may be tuned not to the intermediate frequency but to a frequency within the vestigial side band of the intermediate frequency.

The required progressive boosting of the higher frequencies with increasing frequency, after detection, is effected by the circuit comprising inductance 14 and capacitor 15, these components having values so proportioned that the resonant frequency of said circuit lies outside the range of the operating frequencies so that the circuit has a rising characteristic which approximately or substantially compensates for the attenuation introduced by the elements 6, 9 and 10. In this case resistor 19 and inductance 20 may be chosen so that the video amplifier tube 16 has a substantially flat response. Alternatively, elements 14 and 15 may be omitted, the high frequency boost being obtained by suitably increasing the value of inductance 20. In some cases the capacity 15 may be the cathode-control electrode capacity of tube 16.

Amplifier 23 may not be required in some cases. If provided, it should have a substantially flat response characteristic.

It will be understood that in place of the arrangements shown, other means may be provided for providing a falling frequency response prior to detection and a compensatory rising frequency response following detection.

What I claim is:

A receiver for use in a system of asymmetric side band signalling, including a signal channel, a detector in said channel for said asymmetric side band signals, attenuating means connected in said signal channel prior to said detector for attenuating frequencies corresponding to higher frequency modulating signals relatively to frequencies corresponding to lower frequency modulating signals, whereby the attenuation is progressively greater the higher the modulation frequency with reduced distortion of the detected signals, and means connected in said signal channel subsequent to said detector for boosting higher frequency components of the detected signals relatively to lower frequency components, whereby the boosting is progressively greater the higher the frequency of the detected signals with at least part correction for the attenuation effected by said attenuating means.

WILLIAM SPENCER PERCIVAL.

REFERENCES CITED

The following references are of record in the file of this patent:

UNITED STATES PATENTS

| Number | Name | Date |
|---|---|---|
| 1,913,551 | Hotopp | June 13, 1933 |
| 1,987,984 | Barden | Jan. 15, 1935 |
| 2,063,582 | Chireix | Dec. 8, 1936 |
| 2,158,251 | Polydoroff | May 16, 1939 |
| 2,397,157 | Roberts | Mar. 26, 1946 |
| 2,467,308 | Hansell | Apr. 12, 1949 |